United States Patent [19]
Rodriguez et al.

[11] Patent Number: 6,159,538
[45] Date of Patent: Dec. 12, 2000

[54] METHOD FOR INTRODUCING HYDROGEN INTO LAYERED NANOSTRUCTURES

[76] Inventors: Nelly M. Rodriguez; R. Terry K. Baker, both of 12 Old Stable Dr., Mansfield, Mass. 02048

[21] Appl. No.: 09/334,212

[22] Filed: Jun. 15, 1999

[51] Int. Cl.$^7$ ...................................................... B05D 7/00
[52] U.S. Cl. ................... 427/213.31; 427/212; 427/294; 420/900
[58] Field of Search .............................. 427/212, 213.31, 427/294; 423/448, 460, 445 B; 420/900; 502/526; 164/97, 98

[56] References Cited

U.S. PATENT DOCUMENTS

| | | | |
|---|---|---|---|
| 4,077,788 | 3/1978 | Woollam | 62/48 |
| 4,229,196 | 10/1980 | Woollam | 62/40 |
| 4,580,404 | 4/1986 | Pez et al. | 62/55.5 |
| 4,960,450 | 10/1990 | Schwarz et al. | 62/18 |
| 5,385,876 | 1/1995 | Schwarz et al. | 502/80 |
| 5,653,951 | 8/1997 | Rodriguez et al. | 423/439 |
| 5,698,140 | 12/1997 | Lamb et al. | 252/502 |

OTHER PUBLICATIONS

Applications of Graphite Intercalation Compounds; M. Inagaki Journal of Material Research; vol 4, No. 6, Nov./Dec. 1989; pp. 1560–1568.

Hydrogen Storage Systems Using Activated Carbon; J.S.Noh et al International Journal of Hydrogen Energy; vol. 12, No. 10, pp. 693–700 (No date).

Hydrogen Storage in Graphite Nanofibers; Alan Chambers et al. The Journal of Physical Chemistry; vol. 102, No. 22, pp. 4253–4256 (No date).

Carbon Nanotube Materials From Hydrogen Storage; Dillon et al. Proceedings of the 1995 US DOE hydrogen program review, vol. II National Renewable Energy Lab, Golden CO. (9529807) Sep. 1995 pp. 521–541.

Advanced Materials for Hydrogen Storage: Carbon Nanotubes; Bekkedahl et al. Proceedings of the 1994 DOE/NREL Hydrogen Program Review, Apr. 18–21, 1994 Livermore, CA, National Renewable Energy Lab, Golden, CO (9529807) Jul. 1994 pp. 149–163.

Carbon Nanotubes For Hydrogen Storage; Heben et al; Proceedings of the 1993US DOE hydrogen program review, vol. II National Revewable Energy Lab, Golden CO. (9529807) Aug. 1993; pp. 79–87.

*Primary Examiner*—Shrive Beck
*Assistant Examiner*—Jennifer Calcagni

[57] ABSTRACT

A method for introducing hydrogen into layered nanostructures. The method comprises: a) treating the layered nanostructures with an inert gas at a temperature of at least about 800° C. for an effective amount time; and b) introducing hydrogen into said nanostructures by subjecting the nanostructures to flowing hydrogen at a pressure from about 1,000 psig to about 3,000 psig. The layered nanostructures are characterized as possessing: at least some crystallinity, interstices from about 0.335 nm to 0.67 nm, and sorption properties with respect to hydrogen at those surfaces of the nanostructure which define the interstices. Preferred layered nanostructures are carbon nanostructures such as those selected from carbon nanotubes, carbon fibrils, carbon nanoshells, and carbon nanofibers. Hydrogen is chemisorbed into the interstices of the nanostructures.

14 Claims, No Drawings

METHOD FOR INTRODUCING HYDROGEN INTO LAYERED NANOSTRUCTURES

FIELD OF THE INVENTION

The present invention relates to a method for introducing hydrogen into layered nanostructures. The method comprises: a) treating the layered nanostructures with an inert gas at a temperature of at least about 800° C. for an effective amount of time, and b) introducing hydrogen into said nanostructures by subjecting the nanostructures to flowing hydrogen at a pressure from about 1,000 psig to about 3,000 psig. The layered nanostructures are characterized as possessing: at least some crystallinity, interstices from about 0.335 nm to 0.67 nm, and sorption properties with respect to hydrogen at those surfaces of the nanostructure which define the interstices. Preferred layered nanostructures are carbon nanostructures such as those selected from carbon nanotubes, carbon fibrils, carbon nanoshells, and carbon nanofibers. Hydrogen is chemisorbed into the interstices of the nanostructures.

BACKGROUND OF THE INVENTION

Various technologies are being developed to replace the gasoline-powered internal combustion engine, primarily because of ever stricter environmental regulations. One such replacement technology that is getting much attention is the hydrogen powered fuel cell since hydrogen, which is derived from all kinds of renewable energies, is the only known energy carrier that can be used without causing environmental damage. The failure to produce a practical storage system for hydrogen has prevented hydrogen from coming to the commercial forefront as a transportation fuel. The ideal hydrogen storage system needs to be light, compact, relatively inexpensive, safe, easy to use, and reusable without the need for regeneration. Layered nanostructures have been disclosed in U.S. Pat. No. 5,653,953 to Catalytic Materials Limited, as being capable of sorbing hydrogen into the interstices between the layers. Carbon nanostructures are preferred, particularly graphitic nanostructures. While such layered nanostructures have great commercial potential for storing hydrogen, there remains a need to enhance the introduction of hydrogen into such materials.

SUMMARY OF THE INVENTION

In accordance with the present invention, there is provided a method for introducing hydrogen into layered nanostructures, which process comprises:

(a) treating said layered nanostructures with a flowing inert gas at a temperature from about 800° C. to about 1200° C. for an effective amount of time wherein the layered nanostructures are characterized as having; (i) at least some regions of crystallinity, (ii) interstices within said crystalline regions which interstices are from about 0.335 nm to 0.67 nm, and (iii) surfaces of said nanostructures which define said interstices, which surfaces have sorption properties with respect to hydrogen; and (b) subjecting the treated layered nanostructures to flowing hydrogen at pressures from about 1,000 psig to about 3,000 psig for an effective amount of time.

In a preferred embodiment, the layered nanostructures, after treatement with the inert gas, are treated with flowing helium at a temperature of at least about 100° C.

In another preferred embodiment, the inert gas of step (a) is argon.

In other preferred embodiments, the layered nanostructures are carbon nanostructures selected from the group consisting of carbon nanotubes, carbon fibrils, carbon nanoshells, and carbon nanofibers.

In still other preferred embodiments, the carbon nanostructures are characterized as having: (i) a surface area from about 0.2 to 3,000 $m^2/g$ as determined by $N_2$ adsorption at −196° C., (ii) a crystallinity from about 5% to 100%, and (iii) interstices of about 0.335 nm to 0.67 nm.

In yet other preferred embodiments, the carbon nanostructures are carbon nanofibers characterized as having: (i) a surface area from about 50 to 800 $m^2/g$; (ii) a crystallinity from about 50% to 100%; and (iii) a distance between graphite platelets of about 0.335 nm to about 0.67 nm.

Also, in accordance with the present invention there is provided a method for introducing hydrogen into layered nanostructures, which method comprises:

(a) treating said layered nanostructures with flowing helium at a temperature of at least about 100° C. for an effective amount of time wherein the layered nanostructures are selected from those characterized as having, (i) at least some regions of crystallinity, (ii) interstices within said crystalline regions which interstices are from about 0.335 nm to 0.67 nm, and (iii) surfaces of said nanostructure which define said interstices, which surfaces have sorption properties with respect to hydrogen; and (b) subjecting the treated layered nanostructures to flowing hydrogen at pressures from about 1,000 psig to about 3,000 psig for an effective amount of time.

DETAILED DESCRIPTION OF THE INVENTION

The layered nanostructures of the present invention which are capable of storing hydrogen can be any suitable structure having: (i) a surface area from about 0.2 to 3,000 $m^2/g$, preferably from about 50 to 800 $m^2/g$, more preferably from about 100 to 700 $m^2/g$, and most preferably from about 250 to 350 $m^2/g$, which surface area is determined by $N_2$ adsorption at −196° C.; (ii) a crystallinity from about 5% to about 100%, preferably from about 50% to 100%, more preferably from about 75% to 100%, most preferably from about 90% to 100%, and ideally substantially 100%; (iii) interstices of about 0.335 nm to about 0.67 nm, preferably from about 0.335 nm to about 0.40 nm, and most preferably about 0.335 nm to about 0.347 nm; and surfaces of said nanostructure which define said interstices, which surfaces have sorption properties with respect to hydrogen. The nanostructures used in the present invention can also have a diameter from about 0.75 nm to about 1,000 nm, preferably from about 0.75 nm to about 500 nm, and more preferably from about 0.75 nm to 200 nm. It is to be understood that "nm" means nanometer. Suitable intercalation methods can expand the interlayer spacing up to values of about 1.025 nm.

Such structures will sorb hydrogen into the interstices and will release spontaneously up to about 80% of the initially absorbed hydrogen when pressure is reduced to atmospheric conditions. The remaining hydrogen is not released in any significant quantity until encouraged to do so. Hydrogen can be encouraged to desorb from the intertices by subjecting it to any suitable energy means. Non-limiting energy means which can be used include elevated temperatures, microwaves, sonication, and electrochemical. It is preferred at this time to use elevated temperatures to release hydrogen from the intertices. The most preferred layered nanostructures are carbon nanostructures. Although not wishing to be bound by theory, it is believed that the nanostructures of the present invention store hydrogen by sorbing molecular hydrogen into the interstices of the nanostructure. That is, by a non-dissociative mechanism, as opposed to a dissociative sorption method, like palladium hydrogen absorption wherein the hydrogen molecule is split and atomic hydrogen is held by palladium. While the subject materials will sorb hydrogen, they also have a tendency to sorb contaminants when exposed to the atmosphere. This will be discussed in more detail below.

It is most preferred that the nanostructures be substantially ordered. That is, that they be substantially entirely graphitic having a crystallinity of at least 90%, particularly substantially about 100%, and with a distance between graphite platelets of substantially 0.335nm to 0.347 nm, more typically substantially 0.340 nm. The $\pi$-electrons in the graphite structure are not associated with any individual carbon atom, but are equally shared by all of the carbon atoms in the graphite layer. As a result, each graphite platelet will possess a cloud of electrons above and below the platelet. This feature confers a degree of metallic character on the material and enables it to undergo chemical interactions with selected gas and vapor molecules causing such entities to be strongly held onto the graphite plane surfaces (chemisorbed). In contrast, activated carbon is typically amorphous (none graphitic) and thus is composed of disordered material that has no available cloud of electrons for chemical interactions. In such a case, gas and vapor molecules are held onto the surface by relatively weak physical forces (physisorbed), and thus, selected gas molecules tend to reside within the micropores of the carbon solid. In order to enhance this physical absorption process, it is necessary to maintain the temperature of such materials at a very low temperature level, typically $-96°$ C.

Non-limiting examples of preferred carbon nanostructures are those selected from carbon nanotubes (both single and multi-walled structures), carbon fibrils, carbon nanoshells, and carbon nanofibers. Typically, the carbon nanostructure will be substantially graphitic, and in the case of carbon nanofibers, the most preferred nanostructure, the interstices will be the distance between graphitic platelets of about 0.335 nm. It is to be understood that the terms "carbon filaments", "carbon whiskers", "carbon nanofibers", and "carbon fibrils", are sometimes used interchangeably by those having ordinary skill in the art.

For purposes of the present invention, carbon fibrils, which themselves are sometimes referred to as carbon nanotubes, are of the type described in U.S. Pat. Nos. 4,663,230 and 5,165,909, both of which are incorporated herein by reference. Carbon fibrils are reported to be essentially cylindrical discrete structures characterized by a substantially constant diameter between about 3.5 nm and 70 nm, a length greater than about 5, preferably 100 times the diameter, an outer region of multiple essentially continuous layers of ordered carbon atoms having c-axis that are substantially perpendicular to the cylindrical axis of the fibril, and a distinct inner core region. Each of the layers and core are reported in the above patents to be disposed substantially concentrically about the cylindrical axis of the fibril. The carbon fibrils are catalytically grown by the thermal decomposition of a gaseous carbon-containing compound.

Carbon nanotubes, other than those which are sometimes also referred to as carbon fibrils, will typically be of the fullerene type. Such structures are described in an article by M. S. Dresselhaus et. al. entitled *Fullerenes*, on pages 2087–2092 in *Journal of Materials Research*, Vol 8, No.8, August 1993, which article is incorporated herein by reference. Fullerenes are $C_n$ cage molecules built from a collection of hexagonal and pentagonal faces. The $C_{60}$ fullerenes are typically referred to as "buckminsterfullerenes" or simply "buckyballs". $C_{60}$-derived tubules can be defined, in simplest terms by bisecting a $C_{60}$ (molecule at the equator and joining the two resulting hemispheres with a cylindrical tube one monolayer thick and with the same diameter as $C_{60}$. Carbon nanotubes can also be defined as substantially hollow structures comprised of substantially parallel graphite layers aligned at distances of about 0.335nm to 0.67nm from each other.

Carbon nanoshells, also sometimes referred to as carbon nanoparticles, are typically polyhedral layered structures comprised of multiple layers of carbon, forming substantially closed shells around voids of various shapes and sizes. Such materials are described in an article entitled "Encapsulation Of Lanthanum Carbide In Carbon Nanotubes And Carbon Nanoparticles", by Mingqui Liu and John M. Cowley; *Carbon*, Vol. 33, No. 2, pages 225–232; Elsevier Science Inc., 1995. For purposes of the present invention, a metal which is capable of dissociatively absorbing hydrogen, such as lanthanum and magnesium, is incorporated into the void, or hollow inner core of the carbon nanoshell.

The carbon nanofibers, which are the preferred carbon nanostructures of the present invention, are produced by growing them with the use of a suitable catalyst in the presence of an effective carbon-containing compound. They are preferably grown from unsupported catalytic metal powders; although they can also be grown on a substrate onto which catalytic metal particle precursors have been deposited. Non-limiting examples of suitable substrate materials from which the carbon nanofibers may be grown include: carbon materials, particularly carbon fibers; oxides such as alumina and silica; carbides, such as silicon carbide; nitrides, such as silicon nitride; and metallic substrates, such as a metallic wire, mesh, and screen; cellulosic material, and polymeric foam. It is preferred that the substrate be in a form selected from the group consisting of sheet, fiber, and powder. If a metallic substrate is used from which the nanofibers of the present invention are grown, it is preferred that the metal not be one in which carbon can be readily dissolved. Preferred metallic substrates are those comprised of Ti, Ta, and Al. It is also within the scope of the present invention that a mixture of metal powders be used. That is, where all of the particles are catalyst particles wherein some portion of the particles are non-catalytic, such as ceramic particles. As previously mentioned, it is most preferred in the practice of the present invention that the nanofibers be grown without the use of a substrate.

If a substrate is used onto which is grown the carbon nanofibers of the present invention, conventional techniques can be used to deposit a catalyst metal precursor on the surface of the substrate. Non-limiting examples of such techniques include incipient wetness, vaporization, and electrolytic deposition if the substrate is conducting. A typical incipient wetness technique includes dissolving a suitable salt of each metal of the catalyst in an appropriate solvent, then wetting the substrate, for example, carbon fibers, with the salt solution. The wetted substrate is then dried at a temperature greater than 100° C., preferably from about 105° C. to about 120° C., and more preferably at about 110° C. After drying, they are calcined at a temperature from about 200° to 300° C., thereby converting the individual metals to their respective oxide form. The so-treated substrate is then heated, in a hydrogen containing atmosphere, at a temperature from about 400° to about 600° C., preferably from about 450° to 550° C., for an effective amount of time, to produce the catalyst in an appropriate catalytic form. By effective amount of time, we mean that amount of time needed to reduce substantially all of the metal oxides to the respective multi-metallic state having a suitable particle size. Suitable particle sizes are from about 25 nm to about 1500 nm preferably from about 50 nm to about 1000 nm, and more preferably from about 50 nm to about 200 nm. The catalyst particle size determines the diameter of the nanofiber.

Metal salts suitable for use in the present invention are salts that are soluble in water, as well as in organic solvents. Non-limiting examples of water soluble salts suitable for use herein include nitrates, sulfates and chlorides. Non-limiting examples of salts soluble in organic solvents, which are suitable for use herein include formates, acetates, and oxalates. Preferred are the organic soluble salts because the substrate, if carbon fibers, will not have to be pretreated. However, if the substrate is a ceramic oxide, nitride, or boride, water soluble salts are preferred. Non-limiting examples of organic solvents suitable for use herein include: alcohols; such as methanol, ethanol, propanol, and butanol; ketones, such as acetone; acetates and esters; and aromatics, such as benzene and toluene.

When an aqueous solution of metal salt is used, it is preferred that the surface of the substrate, if carbon fibers, be pretreated to make the surface more acceptable to the catalyst. One preferred method of pretreating the carbon fibers is to oxygenate the fiber surface using atomic oxygen, or a compound that will produce atomic oxygen in a plasma. Although an oxidizing agent, such as nitric acid, can also be used, it is not preferred because it would have a tendency to oxygenate only the defect sites of the surface instead of oxygenating substantially the entire surface as would atomic oxygen. The surface of the substrate is preferably treated with atomic oxygen for an effective amount of time, at about room temperature. By effective amount of time, we mean for that amount of time, preferably for that minimum amount of time, needed to oxygenate substantially the entire surface of the carbon fibers.

If a vaporization technique is used to deposit the catalyst precursor, volatile metal salts, such as carbonyls, or the elemental metal, are used. Vaporization can be accomplished by any appropriate technique, such as vapor deposition.

Catalysts suitable for growing the carbon nanofibers of the present invention are Group VIII metals, preferably Fe and Ni-based catalysts. The catalysts are typically alloys or multi-metallics comprised of a first metal selected from the metals of Group IB of the Periodic Table of the Elements, and a second metal selected from the group consisting of Fe, Ni, Co, Zn, and mixtures thereof. Group IB metals are Cu, Ag, and Au. Preferred are Cu and Ag with Cu being the most preferred. The Group IB metal is present in an amount ranging from about 0.5 to 99 at. % (atomic %). A third metal may also be present. Although there is no limitation with respect to what the particular third metal can be, it is preferred that it be selected from the group consisting of Ti, W, Sn and Ta. When a third metal is present, it is substituted for up to about 20 at. %, preferably up to about 10 at. %, and more preferably up to about 5 at. %, of the second metal. It is preferred that the catalyst be comprised of copper in combination with Fe, Ni, or Co. More preferred is copper in combination with Fe and Ni from an economic point of view. That is, a catalyst of which Fe is used in place of some of the Ni would be less expensive than a catalyst comprised of Cu in combination with only Ni.

The shape of the carbon nanofibers can be any suitable shape. Non-limiting examples of suitable shapes include straight, branched, twisted, spiral, helical, coiled, and ribbon-like. The most preferred shapes for hydrogen storage are the branched and straight nanofibers. It is to be understood that the graphite platelets may have various orientations. For example, they may be aligned parallel, perpendicular, or at an angle with respect to the longitudinal axis of the nanofiber. Further, the surface area of the carbon nanofibers can be increased by careful activation with a suitable etching agent, such as carbon dioxide, steam, or the use of a selected catalyst, such as an alkali or alkaline-earth metal.

The structural forms of the nanostructures of the present invention can be controlled to a significant degree. For example, use of a catalyst which is comprised of only Fe will produce predominantly straight filaments having their graphite platelets substantially perpendicular to the longitudinal axis of the filaments. The distance between the platelets (the interstices) will be between about 0.335 nm and 0.67 nm, preferably from about 0.335 nm to 0.40 nm. It is most preferred that the distance be as close to 0.335 nm as possible, that is, that it be substantially 0.335 nm. The catalyst can also contain up to about 99 atomic %, even up to about 70 atomic %, or even up to about 50 atomic %, preferably up to about 30 atomic %, more preferably up to about 10 atomic %, and most preferably up to about 5 atomic % copper, with the remainder being a Group VIII metal, preferably nickel or iron, more preferably iron. Catalysts having a high copper content (70 atomic % to 99 atomic %) will typically generate nanofibers which are predominantly helical or coiled, and which have a relatively low crystallinity (from about 5 to 25%). Lower concentrations of copper, e.g., 0.5 to 30 atomic % have a tendency to produce spiral and branched filaments, whereas a catalyst with about 30 to 70 atomic %, preferably 30 to 50 atomic % copper will produce predominantly branched filaments.

The nanofibers of the present invention are produced by reacting the catalyst in a heating zone with the vapor of a suitable carbon-containing compound for an effective amount of time. By an effective amount of time, we mean, for that amount of time needed to produce the desired nanofiber structural arrangement. This amount of time will generally be from about 10 minutes to about 8 hours, preferably from about 10 minutes to about 6 hours, more preferably from about 15 minutes to 2 hours, and most preferably from about 15 minutes to about 1 hour. The heating zone is maintained at a temperature from the decomposition temperature of the carbon-containing compound to the deactivation temperature of the catalyst. Generally, this temperature will range from about 500° C. to about 700° C., and preferably from about 550° C. to about 650° C.

Carbon-containing compounds suitable for use in the practice of the present invention are compounds composed mainly of carbon atoms and hydrogen atoms, although carbon monoxide may also be used. The carbon-containing compound, which is typically introduced into the heating zone in gaseous form, will generally have no more than 8 carbon atoms, preferably no more than 6 carbon atoms, more preferably no more than 4 carbon atoms, and most preferably no more than 2 carbon atoms. Non-limiting examples of such compounds include CO, methane, ethane, ethylene, acetylene, propane, propylene, butane, butene, butadiene, pentane, pentene, cyclopentadiene, hexane, cyclohexane, benzene, toluene. Combinations of gases are preferred, particularly carbon monoxide and ethylene.

It may be desirable to have an effective amount of hydrogen present in the heating zone. By an effective amount, we mean that minimum amount of hydrogen which will maintain a clean catalyst surface(free of carbon residue), but not so much that will cause excessive hydrogasification, or burn-off, of carbon from the nanofibers and/or fiber substrate structure, if present. Generally, the amount of hydrogen present will range from about 5 to 40 vol. %, preferably from about 10 to 30 vol. %, and more preferably from about 15 to 25 vol. %. Hydrogen serves two competing functions. For example, on the one hand it acts as a cleaning agent for the catalyst, and on the other hand it hydrogasifies, or causes carbon burn-off, of the carbon structure. For some catalyst systems, such as Cu:Fe, the hydrogasification reaction is relatively slow, thus, an effective amount of hydrogen is needed to clean the catalyst in order to keep it clean of carbon residue and maintain its activity. For other catalyst systems, such as Cu:Ni, where the activity is so high that excessive hydrogasification occurs, even at relatively low levels of hydrogen, little, if any, hydrogen is needed in the heating zone. The Cu:Ni is so active that it utilizes essentially all of the carbon deposited thereon to grow nanofibers, and thus, there is generally no carbon residue to clean off.

After the nanofibers are grown, it may be desirable to treat the final structure with an aqueous solution of an inorganic acid, such as a mineral acid, to remove any excess catalyst particles. Non-limiting examples of mineral acids which can be used include sulfuric acid, nitric acid, and hydrochloric acid. Preferred is hydrochloric acid.

The edges of the graphite platelets may be etched with an appropriate etching agent, preferably carbon dioxide, steam, or a suitable catalyst such as an alkali or alkaline-earth metal. The nanofibers of the present invention are also suitable for the storage of other small gas molecules, such as He, $O_2$, NO, $N_2O$, $NH_3$, CO, $CO_2$, and $CH_4$, which can also be stored between the platelets.

It is also within the scope of the present invention that the nanostructures be treated so as to include minor amounts (about 1 wt. % to 5 wt. %, based on the total weight of the nanostructure) of a metal, preferably a transition metal capable of dissociatively absorbing hydrogen. Preferred transition metal dissociating agents include Pd, Pt, Ni, or alternatively a metal selected from the group consisting of Fe, Ru, Os, Co, Rh, Ir, La, and Mg—which can dissociatively absorb hydrogen.

The layered nanostructures of the present invention are subject to contamination with various molecules when exposed to the atmosphere following their synthesis. It is believed that these contaminants are oxygenated groups that act as centers for the adsorption of oxygen and water molecules—which block the takeup of hydrogen, and thus resulting in a dramatic decrease in hydrogen sorption and storage. Since these layered nanostructure materials possess an extended pore structure where only graphite edges are exposed, they are susceptible to the sorption of gases at these sites. This inhibits the hydrogen sorption properties of the nanostructures. In addition, since the kinetic diameter of water (0.264 Å) is subsequently smaller than the interlayer spacing of the layered nanostructure, for example garphite, which is about 3.4 Å. The nanopore regions can easily get saturated with water vapor, thus interfering with the sorption of hydrogen and preventing the hydrogen storage process.

Although the complete removal of oxygenated groups would reduce, or eliminate, adsorption sites for impurities, caution must be exercised so as to keep a small number of these groups to prevent collapse of the nanostructure. A further method to effect the removal of such oxygenated groups comprises treatment of the nanostructures in a hydrazine solution at a temperature between about 60° and 100° C., preferably at about 80° C. for a period of about one hour.

The process of the present invention will include at least one pretreatment step to remove the aforesaid contaminants so the layered nanostructures can meet their full potential for sorbing and storing hydrogen. The pretreatment process of the present invention is comprised of a first step wherein the nanostructures are treated, for an effective amount of time, with a flowing inert gas, preferably argon, at temperatures from about 800° C. to about 1,200° C., preferably from about 950° C. to about 1,050° C. This treatment is performed to remove substantially all of the chemisorbed contaminant gases and water from the edges and interlayer spacings by heating in argon and/or vacuum. The amount of time for this first pretreatment step will be at least that amount of time needed to remove substantially all of the chemisorbed gases and water, from the nanostructures. This amount of time will typically be from about 15 minutes to 2 hours, more typically from about 30 minutes to about 1 hour. The preferred inert gas is argon and it is used flowing in order to sweep contaminants away from the nanostructures during treatment. The temperatures referred to are the temperatures of the nanostructures during treatment. It is preferred to preheat the inert gas to the desired temperature, then introduce it into suitable equipment, preferably a furnace, containing the nanostructure material to be treated. The treated layered nanostructures are allowed to cool to about room temperature, then placed in a sorption vessel. This vessel can be any suitable vessel that withstand the conditions of pressure and temperature needed for the sorption of hydrogen into the layered nanostructures. The vessel is preferably a stainless steel vessel of adequate size for the volume of nanostructures being treated. An immersion heater or any other suitable heating device along with a stirring device are incorporated within the vessel to ensure that samples are fully outgassed as they are locally heated.

If most of the contaminants are removed during this first pretreatment step, then hydrogen can be introduced into the nanostructures without the need for an additional pretreatment step. If an undesirable amount of contaminants, such as water molecules, are still present on the nanostructures, then the nanostructures are subjected to a second pretreatment step. This second pretreatment step comprises treating the nanostructures with flowing helium at a temperature of at least about 100° C. for an effective amount of time. That is, for at least that amount of time needed to remove substantially all of the contaminants. This amount of time will typically be for at least 12 hours, more typically from about 12 to 36 hours, preferably from aobut 18 to 24 hours. It is preferred that the helium pretreatment be done in the same vessel which will be used for the hydrogen sorption step. If the helium pretreatment step and the hydrogen sorption step are conducted in the same vessel, there is little chance for the nanostructures to become re-contaminated between the helium pretreatment step and the hydrogen sorption step. The upper temperature limit of the helium pretreatment step is limited by the components of the helium pretreat/hydrogen sorption vessel used. The upper temperature will typically be about 350° C. The preferred temperature range of the helium pretreatment step will be from about 200° C. to about 300° C. It is within the scope of the present invention that the pretreatment of the nanostructures comprise only the helium pretreatment without first being treated with an inert gas (argon) at elevated temperatures.

Hydrogen can be sorbed into the carbon nanostructure by introducing flowing hydrogen into the sorption vessel.

Typically, hydrogen will be introduced into a vessel containing a bed of said carbon nanostructures at a pressure which will encourage the hydrogen to be absorbed into the interstices of the nanostructure. Such pressures will typically range from about from about 1,000 psig to about 3,000 psig, preferably from about 1,500 psig to about 2,500 psig, and more preferably from about 1,800 psig to about 2,200 psig. It is within the scope of the present invention that the vessel contain the nanostructures grown from a substrate, preferably from a carbon fiber. When the nanostructures are carbon nanofibers meeting the criteria of the present invention, a hydrogen pressure is used from at least about 300 Torr to the pressure of nanostructure saturation, (possibly as high as several thousand Torr). It is preferred that at least about 350 Torr, more preferably at least about 400 Torr, and most preferably at least about 500 Torr, be used. A Torr is a unit of pressure that is equal to approximately $1.316 \times 10^{-3}$ atmosphere. The temperature at which hydrogen is absorbed into the carbon nanostructures is at any suitable temperature. Preferred are temperatures from about room temperature (22° C.) to about 400° C., preferably from about 200° C. to 400° C., more preferably from about 300° C. to 400° C. Further, hydrogen can be stored in the nanofibers at substantially room temperature and atmospheric pressure for extended periods of time, although it may be desirable to use temperatures lower than room temperature and pressures higher than atmospheric pressure. Other carbon materials, such as activated carbon, require extremely low temperatures to hold the hydrogen in the structure. As previously stated, this is primarily due to the fact that materials, such as activated carbon, do not have adequate sorption properties with respect to hydrogen.

The present invention will be illustrated in more detail with reference to the following examples, which should not be construed to be limiting in scope of the present invention.

EXAMPLE 1

A sample of graphite nanofibers was subjected to two hydrogen absorption/desorption cycles. The graphite nanofibers met the requirements of the present invention (90%–100% crystallinity and 0.335 nm to 0.40 nm distance between graphite platelets). Each absorption/desorption cycle consisted of: a) treating the nanofibers in a suitable pressure vessel with hydrogen at 2,000 psi for 24 hours whereup hydrogen was absorbed into the nanofiber structures, and b) reducing the pressure of the vessel to atmospheric pressure resulting in a major portion of the absorbed hydrogen desorbing from the nanofiber structures. A sample of nanofibers was removed after each absorption/desorption cycle and analyzed for wt. % hydrogen, based on the total weight of the sample. The results are shown in Table 1 below. This sample is identified as "untreated".

EXAMPLE 2

Samples of graphite nanofibers identical to those of Example 1 was first subjected to an argon pretreatment prior to undergoing two hydrogen absorption/desorption cycles. The argon pretreatment consisted of treating a sample of nanofibers with flowing argon for one hour at the temperature indicated in Table 1 below, then subjecting that sample to two hydrogen absorption/desorption cycles as set forth in Example 1. A sample of nanofibers was removed after each hydrogen absorption/desorption cycle for each argon pretreatment temperature and analyzed for wt. % hydrogen. The results are shown in Table 1 below.

TABLE 1

| | Weight % $H_2$ Based on Total Weight of Sample | | | | | | |
|---|---|---|---|---|---|---|---|
| Cycle | | Temperature of Argon Treatment | | | | | |
| # | Untreated | 800° C. | 850° C. | 900° C. | 950° C. | 1000° C. | 1100° C. |
| 1 | 2.12 | 2.97 | 10.38 | 19.07 | 18.68 | 35.65 | 25.16 |
| 2 | 4.25 | 4.45 | 8.16 | 7.33 | 8.96 | 18.57 | 11.1 |

Table 1 evidences the advantages of pretreating the nanofibers with an inert gas prior to the hydrogen absorption step. Also shown is the preferred temperature of pretreatment of 1,000° C.

EXAMPLE 3

A sample of the graphite nanofibers identical to those of Example 1 was first treated with flowing argon at 1000° C. for one hour. The treated nanofibers were cooled to about room temperature (21°–22° C.) then placed in a suitable pressure vessel and treated with flowing helium at 100° C. for 12 hours. While in the same vessel, and without being exposed to the atmosphere, the treated nanofibers were subjected to a number of absorption/desorption cycles as previously described. The wt. % of hydrogen was measured after each cycle and the results are reported in Table 2 below.

EXAMPLE 4

The procedure of Example 3 was followed for another sample of graphite nanofiber identical to those of Example 1, except that the helium treatment was conducted at a temperature of 200° C. instead of at 100° C. The wt. % of hydrogen was again measured after each cycle and the results are shown in Table 2 below.

TABLE 2

| Weight Percent of Hydrogen Based on Total Weight of Sample | | |
|---|---|---|
| Cycle Number | Pre-treatment at 100° C. | Pre-treatment at 200° C. |
| 1st | 7.52 | 39.88 |
| 2nd | 11.29 | 26.44 |
| 3rd | 11.1 | 43.64 |
| 4th | 12.79 | 24.83 |
| 5th | | 24.85 |
| 6th | | 18.06 |

Table 2, when compared to the "untreated" samples of Table 1, evidence the improvement in hydrogen absorption into the nanofiber structures when the nanofibers are treated with helium prior to the hydrogen absorption step.

What is claimed is:

1. A method for introducing hydrogen into layered nanostructures, which method comprises:

(a) treating said layered nanostructures with a flowing inert gas at a temperature from about 800° C. to about 1200° C. for an effective amount of time to remove substantially all contaminants wherein the layered nanostructures are characterized as having: (i) at least some regions of crystallinity, (ii) interstices within said crystalline regions which interstices are from about 0.335 nm to 0.67 nm, and (iii) surfaces of said nanostructures which define said interstices, which surfaces have sorption properties with respect to hydrogen; and (b) subjecting the treated layered nanostructures to flowing hydrogen at pressures from about 1,000 psig to about 3,000 psig for an effective amount of time to absorb hydrogen into said layered nanostructures.

2. The method of claim 1 wherein the inert gas of step (a) is argon.

3. The method of claim 2 wherein the temperature of step (a) is from about 900° C. to about −1050° C.

4. The method of claim 1 wherein the nanostructure is a carbon nanostucture.

5. The method of claim 4 wherein the carbon nanostructure is a carbon nanofiber.

6. The method of claim 1 wherein the nanostructure is intercalated with a suitable metal so that the interstices are up to about 1.025 nm.

7. The method of claim 1 wherein after step (a) and prior to step (b) the layered nanostructures are subjected to flowing helium at temperatures in excess of about 100° C. for an effective amount of time to remove substantially all contaminants.

8. A method for introducing hydrogen into layered nanostructures, which method comprises:

(a) treating said layered nanostructures with flowing helium at a temperature of at least about 100° C. for an effective amount of time to remove substantially all contaminants wherein the layered nanostructures are selected from those characterized as having: (i) at least some regions of crystallinity, (ii) interstices within said crystalline regions which interstices are from about 0.335 nm to 0.67 nm, and (iii) surfaces of said nanostructure which define said interstices, which surfaces have sorption properties with respect to hydrogen; and (b) subjecting the treated layered nanostructures to flowing hydrogen at pressures from about 1,000 psig to about 3,000 psig for an effective amount of time to absorb hydrogen into said layered nanostructures.

9. The method of claim 1 wherein the temperature of step (a) is from about 900° C. to about −1050° C.

10. The method of claim 8 wherein the nanostructure is a carbon nanostucture.

11. The method of claim 10 wherein the carbon nanostructure is a carbon nanofiber.

12. The method of claim 8 wherein the nanostructure is intercalated with a suitable metal so that the interstices are up to about 1.025 nm.

13. The method of claim 3 wherein the layered nanostructures are carbon nanofibers.

14. The method of claim 13 wherein after step (a) and prior to step (b) the carbon nanofibers are subjected to flowing helium at temperatures in excess of about 100° C. for an effective amount of time to remove substantially all contaminants.

* * * * *